United States Patent [19]
Tanaka et al.

[11] Patent Number: 5,963,892
[45] Date of Patent: Oct. 5, 1999

[54] TRANSLATION APPARATUS AND METHOD FOR FACILITATING SPEECH INPUT OPERATION AND OBTAINING CORRECT TRANSLATION THEREOF

[75] Inventors: Miyuki Tanaka; Hiroaki Ogawa; Yasuhiko Kato, all of Tokyo; Tetsuya Kagami, Chiba; Masao Watari, Ibaragi; Makoto Akabane, Tokyo; Kazuo Ishii, Kanagawa; Yasuharu Asano, Tokyo; Hiroshi Kakuda, Kanagawa, all of Japan

[73] Assignee: Sony Corporation, Tokyo, Japan

[21] Appl. No.: 08/670,291

[22] Filed: Jun. 26, 1996

[30] Foreign Application Priority Data

Jun. 27, 1995 [JP] Japan ................................... 7-160345

[51] Int. Cl.⁶ ............................... G06F 17/28; G10F 3/00
[52] U.S. Cl. ................................................ 704/2; 704/277
[58] Field of Search ................................... 704/277, 1–5, 704/231, 251

[56] References Cited

U.S. PATENT DOCUMENTS

| | | | |
|---|---|---|---|
| 4,800,522 | 1/1989 | Miyao et al. | 704/2 |
| 4,984,177 | 1/1991 | Rondel et al. | 704/277 |
| 5,010,486 | 4/1991 | Suzuki et al. | 704/2 |
| 5,220,503 | 6/1993 | Suzuki et al. | 704/2 |
| 5,293,584 | 3/1994 | Brown et al. | 704/277 |
| 5,371,674 | 12/1994 | Obuchi | 704/5 |
| 5,384,701 | 1/1995 | Stentiford et al. | 704/3 |
| 5,457,768 | 10/1995 | Tsuboi et al. | 702/231 |
| 5,615,301 | 3/1997 | Rivers | 704/277 |
| 5,704,013 | 12/1997 | Watari et al. | 395/23 |
| 5,764,853 | 6/1998 | Watari et al. | 395/2.52 |
| 5,796,921 | 8/1998 | Minamino et al. | 395/22 |

FOREIGN PATENT DOCUMENTS

| | | | |
|---|---|---|---|
| 0327408 A2 | 8/1989 | European Pat. Off. | G06F 3/16 |
| 0449230 A2 | 10/1991 | European Pat. Off. | G06F 15/38 |
| 0472193 A2 | 2/1992 | European Pat. Off. | G10L 3/00 |
| 62-229473 | 10/1987 | Japan | G06F 15/38 |

OTHER PUBLICATIONS

U.S. application No. 08/626,132, filed Apr. 5, 1996.

*Primary Examiner*—Forester W. Isen
*Assistant Examiner*—Patrick N. Edouard
*Attorney, Agent, or Firm*—Limbach & Limbach LLP; Seong-Kun Oh

[57] ABSTRACT

A translation apparatus and a translation method arranged to facilitate the operation of inputting a speech and to obtain a correct translation. When a speech in Japanese is input to a microphone by a user, it is recognized in a speech recognition section and one or more words constituting the speech are output to a system control section. The system control section searches Japanese sentences stored in a first language sentence storage section to find one of them most similar to a combination of one or more words output from the speech recognition section. The Japanese sentence thereby found is output through an output section. If this Japanese sentence is correct, the user operates one of control keys. The system control section then searches English sentences stored in a second language sentence storage section to find one of them corresponding to a translation of the Japanese sentence output as a search result, and outputs the English sentence thereby found through the output section.

34 Claims, 3 Drawing Sheets

TRANSLATION APPARATUS AND METHOD FOR FACILITATING SPEECH INPUT OPERATION AND OBTAINING CORRECT TRANSLATION THEREOF

BACKGROUND OF THE INVENTION

1. Field of the Invention

The present invention relates generally to apparatuses and methods for translation and, more particularly, to a translation apparatus and a translation method arranged to facilitate the operation of inputting speech and to obtain correct translation of an input speech by recognizing the input speech in a predetermined language, by outputting a sentence in the same language similar to the combination of one or more words constituting the speech and by outputting a translation of this sentence.

2. Description of the Related Art

Automatic translation apparatuses for translating documents in various fields have recently been developed. In this kind of apparatus, the structure of a sentence in a predetermined language is analyzed and a sentence in another language is formed according to the result of the analysis. Such a method, however, necessitates a large amount of arithmetic operation and also requires inputting the entire sentence in a predetermined language, which operation is troublesome for a user to perform if the sentence is long. Moreover, such a method does not ensure the desired translation accuracy. Ordinary users use translation apparatuses because they are not proficient in non-native languages, and it is difficult for such users to confirm whether translation is correctly made. Generally, apparatuses for such translation are large in size and not easy to carry.

Translation apparatuses reduced in size and simplified in construction to improve the portability (hereinafter referred to as portable translation apparatuses) have also been developed. Such portable translation apparatuses are designed so that, if a series of letters forming a word in a predetermined language is input by an input means, e.g., a keyboard, a translated word in a target language corresponding to the input word is output. That is, such portable translation apparatuses have a dictionary in which words in a predetermined language and words in another language are related so as to have a one-to-one correspondence with each other. For example, if a word "辞書 (dictionary)" (or "じしょ (dictionary)" or "ジショ (dictionary)") is input in the case of translation from Japanese into English, a corresponding translated word "dictionary" is searched out of the dictionary to be outputted.

In this kind of portable translation apparatuses, the probability of a mistranslation is low since words in a predetermined language are previously related to words in another language. Also, the input operation is easy to perform since only a word is input. However, a translation result obtained is only a word and this kind of apparatus is inconvenient with respect to a need for obtaining a sentence as a translation result.

Japanese Patent Laid-Open No. 229473/1987, for example, discloses a translation apparatus in which single-word speech input in a predetermined language is recognized and a sentence in another language corresponding to a combination of words obtained as a result of the speech recognition is output. This translation apparatus separately receives a speech input which may be a word and therefore enables a user to easily input words and can obtain a translation result in the form of a sentence. It therefore enables even a user who is not proficient in foreign languages to easily communicate with foreigners in a tour abroad, for example.

This type of translation apparatus is designed so that, each time single-word speech is input, a corresponding recognition result is output in the same language as that of the input word to enable a user to confirm whether the output result is correct. After the accuracy of all the voice recognition results of the input words have been confirmed, the combination of words is translated. In this process, the user cannot confirm whether a sentence obtained as a translation result is correct.

That is, even if all the recognition results of input word voice are correct, the translation result corresponding to the combination of the recognition results is not always correct. Thus, the user who is not proficient in the translation target language cannot be sure of the correctness of the translation result.

SUMMARY OF THE INVENTION

In view of these circumstances, an object of the present invention is to provide a translation apparatus and a translation method arranged to facilitate the operation of inputting a speech and to obtain a correct translation.

To achieve this object, according to one aspect of the present invention, there is provided a translation apparatus comprising speech recognition section for recognizing a speech and outputting at least one of word constituting the speech, first sentence storage section for storing sentences in a predetermined language, second sentence storage section for storing sentences in another language, first search section for searching the sentences in the predetermined language stored in the first sentence storage section to find one of them similar to a combination of the at least one word output from the speech recognition section, second search section for searching the sentences in the other language stored in the second sentence storage section to find one of them corresponding to a translation of the sentence in the predetermined language found by the first search section, and output section for outputting search results obtained by the first and second search section.

In this translation apparatus, the sentences in the predetermined language stored in the first sentence storage section and the sentences in the other language stored in the second sentence storage section may be related so as to have a one-to-one correspondence with each other. In such a case, the second search section can search the sentences in the other language stored in the second sentence storage section to find one of them corresponding to the sentence in the predetermined language found by the first search section. This translation apparatus may also be provided with operation section operated when a predetermined input is given. In such a case, the second search section can search the sentences in the other language stored in the second sentence storage section to find one of them corresponding to a translation of the sentence in the predetermined language found by the first search section when the predetermined input is given through the operation of the operation section.

According to another aspect of the present invention, there is provided a translation method using first sentence storage section for storing sentences in a predetermined language and second sentence storage section for storing sentences in another language, in which a speech input in the predetermined language is translated into a sentence in the other language, the method comprising the steps of recognizing the input speech and outputting at least one of word constituting the speech, searching the sentences in the predetermined language stored in the first sentence storage section to find and output one of them similar to a combination of the at least one word output as a speech recognition result, and searching the sentences in the other language stored in the second sentence storage section to find and output one of them corresponding to a translation of the sentence in the predetermined language output as a search result when a predetermined input is given.

In the translation apparatus of the present invention, the speech recognition section recognizes a speech and outputs one or more words constituting the speech. Sentences in a predetermined language are stored in the first sentence storage section while sentences in another language are stored in the second sentence storage section. The first search section searches the sentences in the predetermined language stored in the first sentence storage section to find one of them similar to a combination of one or more words output from the speech recognition section. The second search section searches the sentences in the other language stored in the second sentence storage section to find one of them corresponding to a translation of the sentence in the predetermined language found by the first search section. The output section outputs search results obtained by the first and second search section.

In the translation method of the present invention, a speech is recognized and one or more words constituting the speech are output. The sentences in the predetermined language stored in the first sentence storage section are searched to find and output one of them similar to a combination of one or more words output as a speech recognition result. Thereafter, when a predetermined input is given, the sentences in the other language stored in the second sentence storage section are searched to find and output one of them corresponding to a translation of the sentence in the predetermined language output as a search result.

DESCRIPTION OF THE PREFERRED EMBODIMENT

To clarify the correspondence between the means of the present invention set forth in the claims and the embodiment described below, the features of the present invention will first be described by indicating an example of the portion or process step of the embodiment corresponding to each means in parentheses following the name of the means.

That is, the translation apparatus as set forth in accordance with the present invention is a translation apparatus for translating a speech input in a predetermined language into a speech in another language. This apparatus comprises speech recognition means (e.g., speech recognition section 2 shown in FIG. 1) for recognizing an input speech and outputting one or more words constituting the speech, first sentence storage means (e.g., first language sentence storage section 5 shown in FIG. 1) for storing sentences in the predetermined language, second sentence storage means (e.g., second language sentence storage section 6 shown in FIG. 1) for storing sentences in the other language, first search section (e.g., process step S3 in the program shown in FIG. 3) for searching the sentences in the predetermined language stored in the first sentence storage menns to find one of them similar to a combination of one or more words output from the speech recognition means, second search means (e.g., process step S6 in the program shown in FIG. 3) for searching the sentences in the other language stored in the second sentence storage means to find one of them corresponding to a translation of the sentence in the predetermined language found by the first search means, and output means (e.g., output section 7 shown in FIG. 1) for outputting search results obtained by the first and second search means.

The translation apparatus as set forth in accordance with the present invention further comprises operation means (e.g., control keys 3 shown in FIG. 1) operated when a predetermined input is given. In this apparatus the second search means searches the sentences in the other language stored in the second sentence storage section to find one of them corresponding to a translation of the sentence in the predetermined language found by the first search means when the predetermined input is given through the operation of the operation means.

The translation method as set forth in accordance with the present invention is a method of translating a speech input in a predetermined language into a sentence in another language using first sentence storage means (e.g., first language sentence storage section 5 shown in FIG. 1) for storing sentences in the predetermined language, and second sentence storage means (e.g., second language sentence storage section 6 shown in FIG. 1) for storing sentences in the other language. In this method, an input speech is recognized, one or more words constituting the speech is output, and the sentences in the predetermined language stored in the first sentence storage means are searched to find and output one of them similar to a combination of the one or more words output as a speech recognition result. When a predetermined input is given, the sentences in the other language stored in the second sentence storage means are searched to find and output one of them corresponding to a translation of the sentence in the predetermined language output as a search result.

Needless to say, this description is not intended to limit the means in the claims to the above-described examples.

Figure 1:
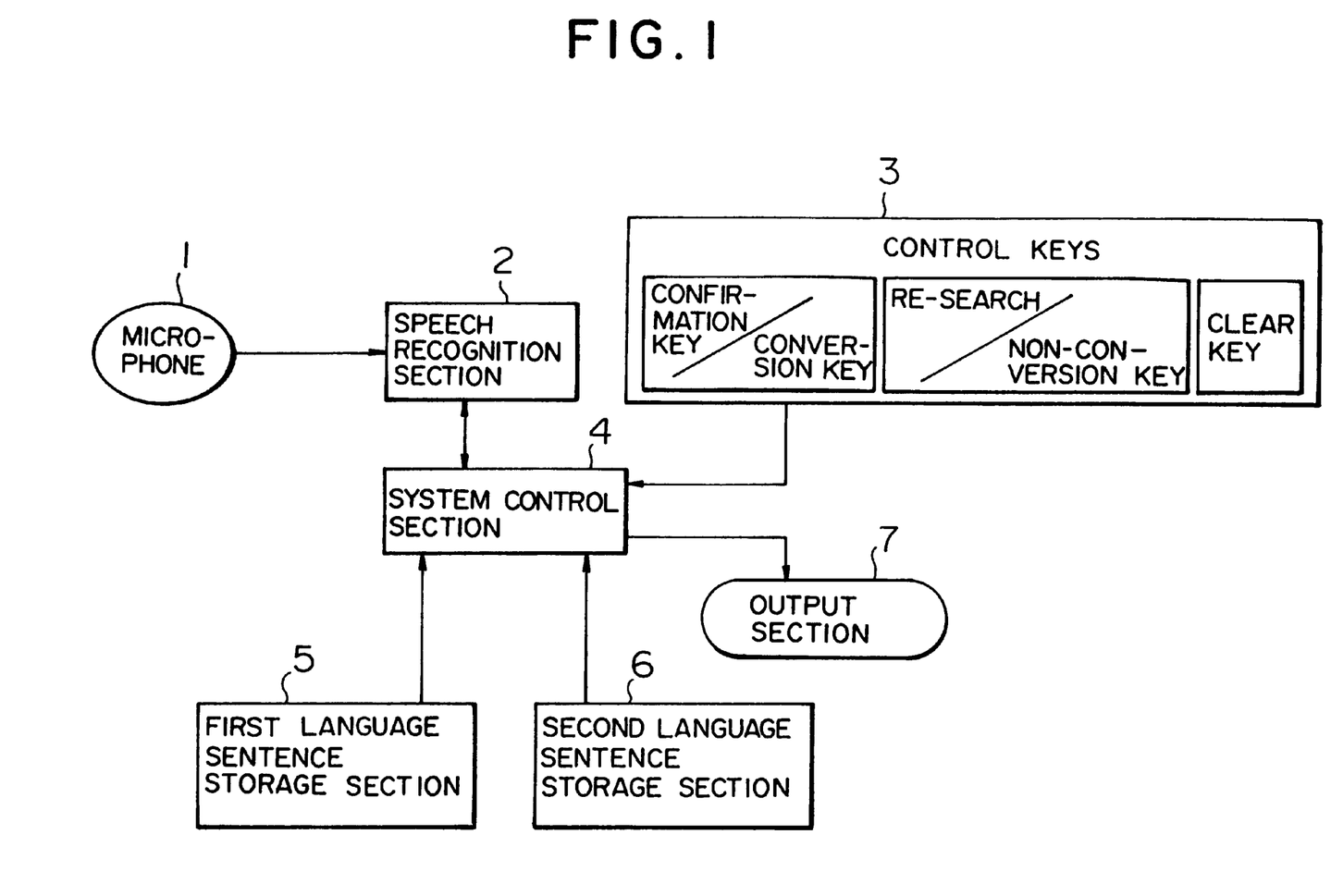
FIG. 1 is a block diagram of the configuration of an embodiment of a translation apparatus in accordance with the present invention.

FIG. 1 shows the configuration of an embodiment of a translation apparatus (speech translation apparatus) in accordance with the present invention. For example, this translation apparatus is arranged to translate a speech input in Japanese into English.

Figure 2:
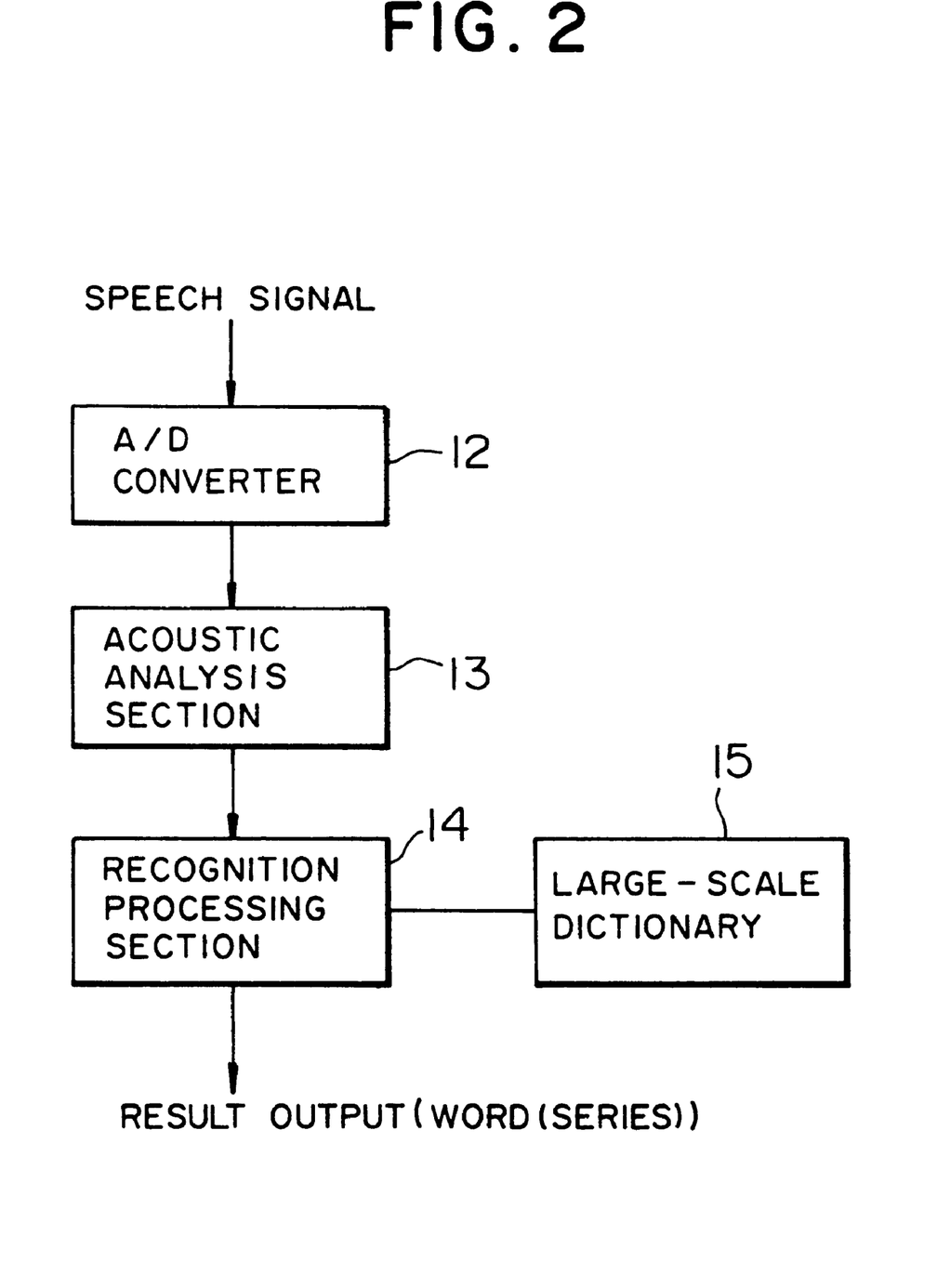
FIG. 2 is a block diagram of details of speech recognition section 2 shown in FIG. 1.

A microphone 1 converts an input speech into a speech signal as an electrical signal and outputs this signal to a speech recognition section 2. The speech recognition section 2 is arranged to recognize each word in the speech input to the microphone 1. For example, the speech recognition section 2 is formed of an A/D converter 12, an acoustic analysis section 13, a recognition processing section 14 and a large-scale dictionary 15, as shown in FIG. 2.

The A/D converter 12 quantizes the analog speech signal supplied from the microphone 1 by sampling the analog speech signal by the timing of a predetermined clock, thereby converting the analog speech signal into a digital speech signal (digital data). The acoustic analysis section 13 analyzes the acoustic form of the speech signal output from the A/D converter 12 and thereby extracts feature parameters of the speech such as the power of the speech sound in each of predetermined ranges or linear predictor coefficients (LPC) and cepstrum coefficients. That is, the acoustic analysis section 3 filters the speech signal with respect to each of the predetermined ranges by, for example, a filter bank, and rectifies and smoothes the result of filtering to obtain the power of the speech sound in each predetermined range, or processes the speech input by, for example, linear predictive coding to obtain linear prediction coefficients and obtains cepstrum coefficients from the linear prediction coefficients.

The feature parameters obtained by the acoustic analysis section 3 are output to the recognition processing section 4 directly or after undergoing vector quantization in the acoustic analysis section 3 if necessary.

The recognition processing section 4 performs, for example, speech recognition on the basis of the feature parameters supplied from the acoustic analysis section 3 (or symbols obtained by vector-quantizing the feature parameters) and in accordance with a speech recognition algorithm of, for example, a dynamic programming (DP) matching method, a hidden Markov model (HMM) or the like by referring to the large-scale dictionary 15 described below. The recognition processing section 4 outputs, as a speech recognition result, one or more words contained in the speech input to the microphone 1.

In the large-scale dictionary 15, standard patterns (or models) of words as objects of speech recognition (i.e., Japanese words in this embodiment) are stored. In the recognition processing section 14, speech recognition is performed with reference to these words stored in the large-scale dictionary 15.

Control keys 3 consisting of various kinds of keys are provided, each of which is operated to input a predetermined instruction or the like to a system control section 4. That is, control keys 3 include a confirmation/conversion key for making the system control section 4 recognize whether a sentence output from an output section 7 described below is right or wrong, a re-search/non-conversion key, and a clear key for canceling an output state (displaying state) of the output section 7.

The system control section 4 is arranged to control the sections constituting the apparatus and to perform other kinds of processing including processing of searching sentences stored in a first language sentence storage section 5 or a second language sentence storage section 6 and processing for outputting a sentence to the output section 7.

The first language sentence storage section 5 stores a multiplicity of sentences in a language corresponding to the language of speech input to the microphone 1, i.e., the Japanese language in this embodiment. The second language sentence storage section 6 stores sentences in the target language into which the Japanese sentences stored in the first language sentence storage section 5 are translated, i.e., English sentences in this embodiment. Accordingly, the Japanese sentences stored in the first language sentence storage section 5 and the English sentences stored in the second language sentence storage section 6 correspond to each other in a one-to-one relationship. For example, in the first language sentence storage section 5, addresses of the English sentences in the second language sentence storage section 6 are stored together with the Japanese sentences corresponding to the English sentences, thereby enabling each of the English sentences corresponding to the Japanese sentences stored in the first language sentence storage section 5 to be immediately searched out of the second language sentence storage section 6.

The output section 7 is formed by, for example, a voice synthesizer and a speaker or a visual monitor or the like. The output section 7 outputs one of the Japanese sentences stored in the first language sentence storage section 5 and one of the English sentences stored in the second language sentence storage section 6 (in the form of synthesized voice or an image displayed).

The operation of this apparatus will now be described with reference to the flowchart of FIG. 3. In this speech translation apparatus, when a user inputs, for example, a series of independent words or the like in the form of speech representing a Japanese sentence which the user wants to translate into English, the series of words is recognized by speech recognition and is rearranged to form a sentence in Japanese before being translated. This Japanese sentence is then presented to the user. If the user confirms that the Japanese sentence is right, the Japanese sentence is translated into English.

That is, in step S1, if a speech is input, it is converted into an electrical speech signal which is output to the speech recognition section 2. The speech input may be a series of words which is not formed as an ordinary sentence, as mentioned above. That is, if the user wants to obtain an English translation of a sentence such as "Anatano Suki-na Restaurant-wo Oshiete Kudasai (Tell me a restaurant you like)", he or she may input a series of words such as "anata (you), suki (like), restaurant, oshieru (tell)". It can therefore be said that it is not so troublesome for the user to input the speech in this manner. It is not necessary that the order of input words be equal to the order of the words in the resulting sentence. That is, with respect to the above-described example of the input, a series of words "oshieru (tell), anata (you), suki (like), restaurant", for example, may alternatively be input.

In Step S2, the speech recognition section 2 (FIG. 2) performs speech recognition of each word constituting the series of words input in the form of speech to the microphone 1. That is, the speech signal from the microphone 1 is changed into feature parameters (or symbols) by being processed through the A/D converter 12 and the acoustic analysis section 13, and the feature parameters are output to the recognition processing section 14. The recognition processing section 14 performs speech recognition of the output from the acoustic analysis section 13 with the words in the large-scale dictionary 15 referred to as speech recognition targets.

The speech input is a series of independent words, as mentioned above. Ordinarily, therefore, short pausing or soundless periods are inserted between the durations of words in the input speech. The recognition processing section 14 performs speech recognition of each word constituting the input word series by detecting such pauses and recognizing them as separation between words. Accordingly, a unit incapable of continuous speech recognition but capable of word recognition simpler than continuous speech recognition may suffice as recognition processing section 14, so that increase in the size and cost of the recognition processing section 14 can be avoided. Therefore, increase in the size and manufacturing cost of the translation apparatus can also be avoided.

The series of one or more words obtained as a result of speech recognition is supplied to the system control section 4. In step S3, when the system control section 4 receives one or more words as a speech recognition result from the speech recognition section 2 (recognition processing section 14), it searches the Japanese sentences stored in the first language sentence storage section 5 to find one of these sentences most similar to the combination of these words.

Searching in step S3 is performed as described below. For example, the system control section 4 searches the first language sentence storage section 5 for a Japanese sentence containing all the words obtained as a result of speech recognition (hereinafter referred to as recognized words as occasion requires). If such a Japanese sentence exists, the system control section 4 reads out it from the first language sentence storage section 5 as a sentence most similar to the combination of the recognized words. If there is no sentence containing all the recognized words in the Japanese sentences stored in the first language sentence storage section 5, the system control section 4 searches for a Japanese sentence containing a group of words in the recognized words excluding one of the recognized words. If such a Japanese sentence exists, the system control section 4 reads out it from the first language sentence storage section 5 as a sentence most similar to the combination of the recognized words. If no Japanese sentence satisfying this condition exists, the system control section 4 searches for a Japanese sentence containing a group of words in the recognized words excluding two of the recognized words. The condition of selection of a most similar sentence is thus changed until a suitable one is searched out.

After searching out a Japanese sentence most similar to the combination of the recognized words in Step S3, the process advances to step S4 and the Japanese sentence searched out is supplied from the system control section 4 to the output section 7 to be output. To each of the Japanese sentences stored in the first language sentence storage section 5, character codes for characters forming the Japanese sentence or phoneme information and rhythm information of the Japanese sentence are added. These kinds of data are supplied to the output section 7. In the output section 7, characters corresponding to character codes are displayed on the monitor. Alternatively, in the output section 7, synthesized voice is generated on the basis of phoneme information and rhythm information by the voice synthesizer and output through the speaker. That is, in the output section 7, the Japanese sentence is displayed on the monitor or is output in the form of synthesized voice. (In this specification, each of such visual display or output of synthesized voice is referred to as "output".)

The user confirms whether the Japanese sentence output from the output section 7 is right. That is, if the Japanese sentence output from the output section 7 is right, the user operates the confirmation/conversion key in the control keys 3. If the Japanese sentence output from the output section 7 is wrong, the user operates the re-search/non-conversion key in the control keys 3. In step S5, the system control section 4 determines the operated state of one of the keys.

If it is determined in step S5 that the re-search/non-conversion key has been operated, that is, if the Japanese sentence output in step S4 is wrong, the process returns to step S1. In this case, the speech is again input by the user and the above-described processing is repeated.

Figure 3:
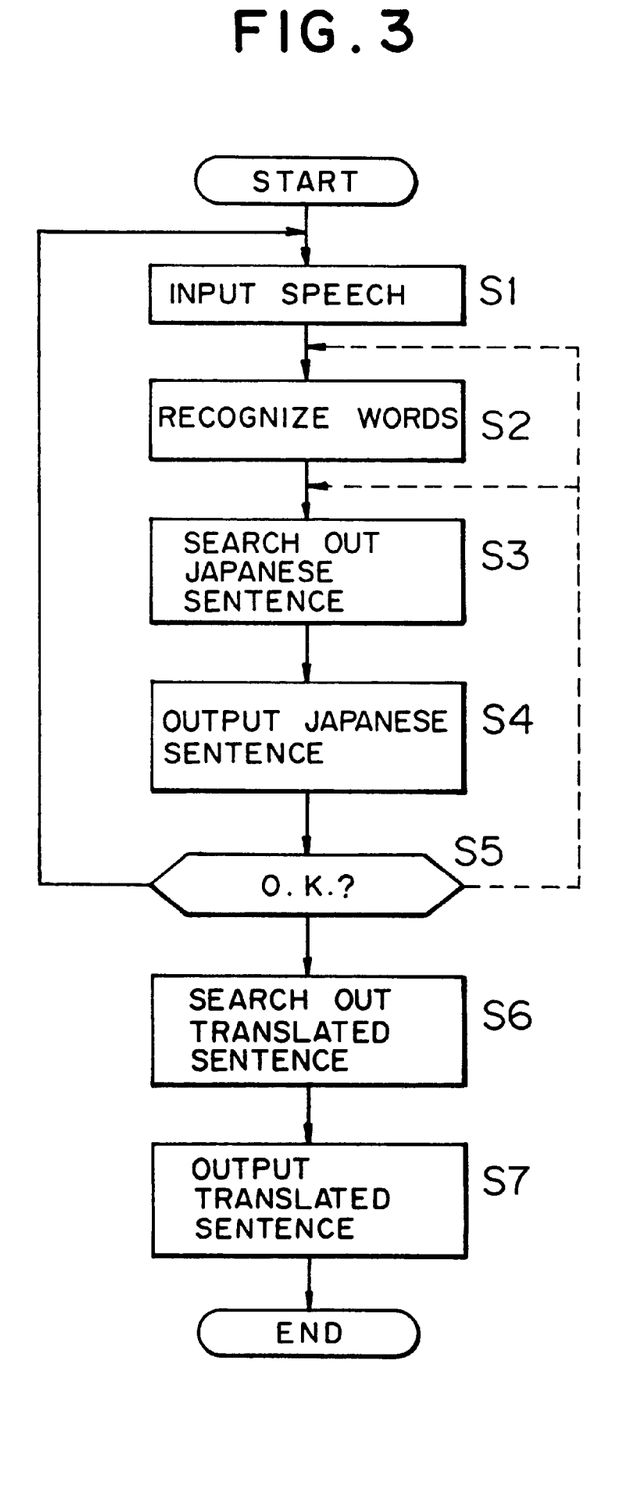
FIG. 3 is a flowchart of the operation of the translation apparatus shown in FIG. 1.

Alternatively, the process may returns to step S2 or S3, as indicated by the broken line in FIG. 3, instead of returning to step S1 if it is determined in step S5 that the re-search/non-conversion key has been operated. If the process returns to step S2, a word having the next highest likelihood in probable speech recognition results obtained by speech recognition processing of the speech input in step S1 is output as a speech recognition result from the speech recognition section 2. That is, in the recognition processing section 14 of the speech recognition section 2, the likelihood representing the similarity of each word stored in the large-scale dictionary 15 to each element of the input speech is calculated. Ordinarily, the word having the highest likelihood is output as a speech recognition result. If the Japanese sentence output in step S4 is wrong, it is possible that at least one of the words having the highest likelihood, output as a speech recognition result, is wrong. Therefore, a word having the next highest likelihood is then output as a speech recognition result and the processing of step S3 and so on is repeated.

If the process returns from step S5 to step S3, the Japanese sentences other than the Japanese sentence previously output is searched for a suitable one. That is, if the Japanese sentence output in step S4 is wrong, it is possible that the searching processing performed in step S3 is erroneous. Therefore, searching is again performed with respect to the Japanese sentences other than the Japanese sentence obtained by the erroneous searching processing.

On the other hand, if it is determined in step S5 that the confirmation/conversion key has been operated, that is, if the Japanese sentence output in step S4 is right (if the meaning of the Japanese sentence output in step S4 is substantially equal to the meaning of the speech input in step S1), the process advances to step S6 and the system control section 4 searches the second language sentence storage section 6 for the English sentence to be read out as a translation of the Japanese sentence output in step S4. That is, when the confirmation/conversion key is operated, the system control section 4 reads out, from the second language sentence storage section 6, the English sentence corresponding to the Japanese sentence output from the output section 7.

Then, in step S7, the English sentence is supplied to the output section 7 to be output, thereby completing the process. For example, in the second language sentence storage section 6, the English sentences are stored together with character codes for characters forming the English sentences or phoneme information and rhythm information of the English sentences, as is the data in the first language sentence storage section 5. These kinds of data are supplied to the output section 7. Accordingly, in step S7, the English sentence is displayed on the monitor or is output as synthesized voice in the same manner as in step S4.

As described above, a speech input in Japanese is output as a Japanese sentence to be confirmed and the English sentence as an English translation of the Japanese sentence is output after the confirmation, thereby enabling the user to easily confirm whether the English sentence is right. In this embodiment, there is no possibility of a translation error since the Japanese sentences and the English sentences are related to each other.

The present invention has been described with respect to an application to a translation apparatus for translation from Japanese into English. However, the present invention is also applicable to apparatuses for translation of any other languages, e.g., an apparatus for translation from a language other than Japanese into English and an apparatus for translation from Japanese to a language other than English.

In the above-described embodiment, only independent words are treated as speech recognition objects. However, words other than independent words may be included in speech recognition objects.

The speech recognition algorithm used in the speech recognition section 2, the method of forming synthesized voice in the output section 7 and the method of searching for a Japanese sentence similar to recognized words are not particularly limited.

In the above-described embodiment, isolated word recognition is performed in the speech recognition section 2. The speech recognition section 2, however, may also be arranged to perform continuous speech recognition or word spotting other than isolated word recognition.

In the above-described embodiment, one of the control keys 3 is operated for confirmation as to whether a Japanese sentence output in step S4 is right. Alternatively, for this confirmation, inputting a speech to the microphone 1, for example, may be performed.

In the above-described embodiment, only confirmation of Japanese sentences is made. However, each of words recognized in speech recognition section, for example, may also be confirmed.

In the above-described embodiment, the first language sentence storage section 5 and the second language sentence storage section 6 are formed separately from each other. However, they may be integrally combined into one unit.

As described above, in the translation apparatus and the translation method of the present invention, a speech is recognized and one or more words constituting the speech is output. Then a sentence in a predetermined language similar to the combination of one or more words output as a speech recognition result is found and output by searching sentences stored in the first sentence storage means. Thereafter, a sentence in another language corresponding to a translation of the sentence in the predetermined language output as a search result is found and output by searching sentences stored in the second sentence storage means. Thus, a desired input can easily made and a corresponding correct translation can be obtained.

What is claimed is:

1. A translation apparatus for translating a speech input in a first language into a sentence in a second language, comprising:

speech recognition means for recognizing an input speech and outputting at least one of word constituting the speech;

first sentence storage means for storing sentences in the first language;

second sentence storage means for storing sentences in the second language;

first search means for searching the sentences stored in said first sentence storage means to find one of the sentences similar to a combination including at least one word output from said speech recognition means;

second search means for searching the sentences stored in said second sentence storage means to find one of the sentences corresponding to a translation of the sentence in the first language found by said first search means; and output means for outputting search results obtained by said first and second search means.

2. The translation apparatus of claim 1, wherein the sentences stored in said first sentence storage means and the sentences stored in said second storage means correspond to each other in a one-to-one relationship, and wherein said second search means searches the sentences stored in said second sentence storage means to find one of the sentences corresponding to the sentence in the first language found by said first search means.

3. The translation apparatus of claim 1, further comprising operation means operated when a predetermined input is given, wherein said second search means searches the sentences stored in said second sentence storage means to find one of the sentences corresponding to a translation of the sentence in the first language found by said first search means after the predetermined input has been given through the operation of said operation means.

4. The translation apparatus of claim 2, wherein said first sentence storage means stores the sentences in the first language and addresses in said second sentence storage means with which the sentences in the second language corresponding to the sentences in the first language are stored.

5. The translation apparatus of claim 3, wherein said second search means starts the searching operation if the predetermined input signifies that the sentence in the first language found by said first search means is accurate.

6. The translation apparatus of claim 3, wherein said first search means again performs the searching operation if the predetermined input signifies that the sentence in the first language found by said first search means is inaccurate.

7. The translation apparatus of claim 1, wherein said output means first outputs the sentence in the first language obtained by said first search means and outputs the sentence in the second language obtained by said second search means after the sentence in the first language has been confirmed.

8. The translation apparatus of claim 1, wherein the input speech in the first language is a speech input in the form of a series of independent words.

9. A translation method using first sentence storage means for storing sentences in a first language and second sentence storage means for storing sentences in a second language, in which a speech input in the first language is translated into a sentence in the second language, said method comprising the steps of:

recognizing an input speech and outputting at least one of word constituting the speech;

searching the sentences stored in said first sentence storage means to find and output one of the sentences similar to a combination including at least one word output as a speech recognition result; and searching the sentences stored in said second sentence storage means to find and output one of the sentences corresponding to a translation of the sentence in the first language output as a search result when a predetermined input is given.

10. The translation apparatus of claim 1 wherein said speech recognition section includes:

an analog-to-digital converter for quantizing the input speech and for generating a corresponding digital speech signal;

an acoustic analyzer for analyzing the acoustic form of the digital speech signal and for extracting feature parameters of the speech signal;

a dictionary for storing standard word patterns; and a recognition processor for performing speech recognition on the basis of the feature parameters and in accordance with the standard word patterns.

11. The translation apparatus of claim 10 further including a clock configured to provide a clock signal, and further, wherein said analog-to-digital converter is configured to sample the input speech in accordance with the clock signal to generate the digital speech signal.

12. The translation apparatus of claim 10 wherein the feature parameters of the speech signal includes the power of the speech signal in each of a predetermined ranges of speech signal.

13. The translation apparatus of claim 12 wherein the acoustic analyzer is configured to filter the speech signal with respect to each of the predetermined ranges to generate an filtered speech signal, and further, wherein the acoustic analyzer is further configured to rectify and smooth the filtered speech signal.

14. The translation apparatus of claim 10 wherein said output means includes a voice synthesizer and a speaker, or a visual monitor.

15. The method of claim 9 wherein the sentences stored in said first sentence storage means and the sentences stored in said second storage means correspond to each other in a one-to-one relationship, and further including the step of searching the sentences stored in said second sentence storage means to find one of the sentences corresponding to the sentence in the first language found by said first search means.

16. The method of claim 9 further including the step of operating an operating means when a predetermined input is given, wherein said step of searching said second sentence storage means further includes the step of searching the sentences stored in said second sentence storage means to find one of the sentences corresponding to a translation of the sentence in the first language found by said step of searching said first sentence storage means after the predetermined input has been given through the step of operating said operation means.

17. The method of claim 15 further including the step of storing the sentences in the first language and addresses in said second sentence storage means with which the sentences in the second language corresponding to the sentences in the first language are stored.

18. The method of claim 16 further including the step of performing the searching operation if the predetermined input signifies that the sentence in the first language found by said first search means is accurate.

19. The method of claim 16 further including the step of re-performing the searching operation if the predetermined input signifies that the sentence in the first language found by said first search means is inaccurate.

20. The method of claim 9 further including the steps of outputting the sentence in the first language obtained by said first search means and outputting the sentence in the second language obtained by said second search means after the sentence in the first language is confirmed.

21. The method of claim 9 wherein the input speech in the first language is a speech input in the form of a series of independent words.

22. The method of claim 9 wherein said step of recognizing the input speech includes the steps of:

quantizing the input speech and generating a corresponding digital speech signal;

analyzing the acoustic form of the digital speech signal and extracting feature parameters of the speech signal;

storing standard word patterns; and performing speech recognition on the basis of the feature parameters and in accordance with the standard word patterns.

23. The method of claim 22 further including the step of providing a clock signal, wherein said step of quantizing further includes the step of sampling the input speech in accordance with the clock signal to generate the digital speech signal.

24. The method of claim 22 wherein the feature parameters of the speech signal includes the power of the speech signal in each of a predetermined ranges of speech signal.

25. The method of claim 24 wherein the step of analyzing includes the steps of filtering the speech signal with respect to each of the predetermined ranges to generate an filtered speech signal, and rectifying and smoothing the filtered speech signal.

26. A translation apparatus for translating a speech input in a first language into a sentence in a second language, comprising:

speech recognition means for recognizing an input speech and outputting at least one of word constituting the speech;

first sentence storage means for storing sentences in the first language;

second sentence storage means for storing sentences in the second language;

first search means for searching the sentences stored in said first sentence storage means to find one of the sentences similar to a combination including at least one word output from said speech recognition means;

operation means operated when a predetermined input is given;

second search means for searching the sentences stored in said second sentence storage means to find one of the sentences corresponding to a translation of the sentence in the first language found by said first search means after the predetermined input has been given through the operation of said operation means; and output means for outputting search results obtained by said first and second search means;

wherein said output means first outputs the sentence in the first language obtained by said first search means and outputs the sentence in the second language obtained by said second search means when the sentence in the first language is confirmed.

27. The translation apparatus of claim 26, wherein the sentences stored in said first sentence storage means and the sentences stored in said second storage means correspond to each other in a one-to-one relationship, and further, wherein said first sentence storage means stores the sentences in the first language and addresses in said second sentence storage means with which the sentences in the second language corresponding to the sentences in the first language are stored.

28. The translation apparatus of claim 26, wherein said second search means starts the searching operation if the predetermined input signifies that the sentence in the first language found by said first search means is accurate.

29. The translation apparatus of claim 28, wherein said first search means again performs the searching operation if the predetermined input signifies that the sentence in the first language found by said first search means is inaccurate.

30. The translation apparatus of claim 26, wherein the input speech in the first language is a speech input in the form of a series of independent words.

31. The translation apparatus of claim 26 wherein said speech recognition means includes:

an analog-to-digital converter for quantizing the input speech and for generating a corresponding digital speech signal;

an acoustic analyzer for analyzing the acoustic form of the digital speech signal and for extracting feature parameters of the speech signal;

a dictionary for storing standard word patterns; and a recognition processor for performing speech recognition on the basis of the feature parameters and in accordance with the standard word patterns.

32. The translation apparatus of claim 31 further including a clock configured to provide a clock signal, and further, wherein said analog-to-digital converter is configured to sample the input speech in accordance with the clock signal to generate the digital speech signal.

33. The translation apparatus of claim 31 wherein the acoustic analyzer is configured to filter the speech signal with respect to each of the predetermined ranges to generate an filtered speech signal, and further, wherein the acoustic analyzer is further configured to rectify and smooth the filtered speech signal.

34. The translation apparatus of claim 26 wherein said output means includes a voice synthesizer and a speaker, or a visual monitor.

* * * * *